(12) United States Patent
Korpi et al.

(10) Patent No.: US 7,093,909 B1
(45) Date of Patent: Aug. 22, 2006

(54) VISUAL AND THERMAL SHIELD SYSTEM

(75) Inventors: John G Korpi, Livonia, MI (US); Michael J Manceor, Troy, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/460,817

(22) Filed: Jun. 13, 2003

(51) Int. Cl.
 *B60B 7/04* (2006.01)
 *B60B 7/01* (2006.01)

(52) U.S. Cl. .................... 301/37.25; 301/37.23

(58) Field of Classification Search ........... 301/37.101, 301/37.22, 37.23, 37.371, 37.42, 37.376, 301/108.1–108.4, 37.25, 6.91, 37.102, 37.41; 40/587
See application file for complete search history.

(56) References Cited

U.S. PATENT DOCUMENTS

| | | | | |
|---|---|---|---|---|
| 749,441 A * | 1/1904 | Jones | ........................... | 40/587 |
| 1,403,446 A * | 1/1922 | Rothmann | ................... | 280/156 |
| 1,981,227 A * | 11/1934 | Fuchs | ........................... | 40/587 |
| 2,387,188 A * | 10/1945 | Spingler | ..................... | 280/160 |
| 2,759,282 A * | 8/1956 | Lecourt | ........................ | 40/587 |
| 2,934,124 A * | 4/1960 | Mihlsten | ..................... | 152/153 |
| 3,103,369 A * | 9/1963 | Gaines et al. | ................. | 280/63 |
| 4,165,904 A * | 8/1979 | Reppert | .................. | 301/35.631 |
| 4,708,397 A * | 11/1987 | Weinmann | ............. | 301/35.632 |
| 4,712,838 A * | 12/1987 | Berg et al. | ............... | 301/37.41 |
| 4,981,329 A * | 1/1991 | Koch et al. | .............. | 301/37.25 |
| 5,190,354 A * | 3/1993 | Levy et al. | ............... | 301/37.25 |
| 5,531,508 A * | 7/1996 | Bell, III | .................. | 301/37.23 |
| 6,048,036 A * | 4/2000 | Alaoui | .................. | 301/37.376 |
| 6,254,194 B1 * | 7/2001 | Capouellez et al. | ..... | 301/37.23 |
| 6,443,529 B1 * | 9/2002 | Williams | ................. | 301/37.25 |
| 6,517,167 B1 * | 2/2003 | Baker | ....................... | 301/37.25 |
| 6,868,628 B1 * | 3/2005 | Stathis | ........................ | 40/587 |

FOREIGN PATENT DOCUMENTS

| | | | | |
|---|---|---|---|---|
| DE | 3631489 A1 * | 3/1988 | .............. | 301/37.23 |
| GB | 2232129 A * | 5/1990 | .............. | 301/37.23 |

* cited by examiner

*Primary Examiner*—Jason R. Bellinger
(74) *Attorney, Agent, or Firm*—David L. Kuhn; Luis Miguel Acosta; Thomas W. Saur

(57) ABSTRACT

There is disclosed herein a visual and thermal shield system that effectively obscures visual indicators and thermal signatures of wheel assemblies of a military vehicle to thereby address longstanding military concerns for vehicle and crew survivability. Our device is spaced outboard from the wheel and tire to maintain an insulating body of air between said shield and the adjacent axle, hub, wheel, and tire. Expeditiously, this invention also affords substantial eclipse of the complete tire profile. If a plurality of wheels exist on said vehicle, then multiple shields of this invention can be used to hinder vehicle identification and potential designation of its military purpose.

10 Claims, 5 Drawing Sheets

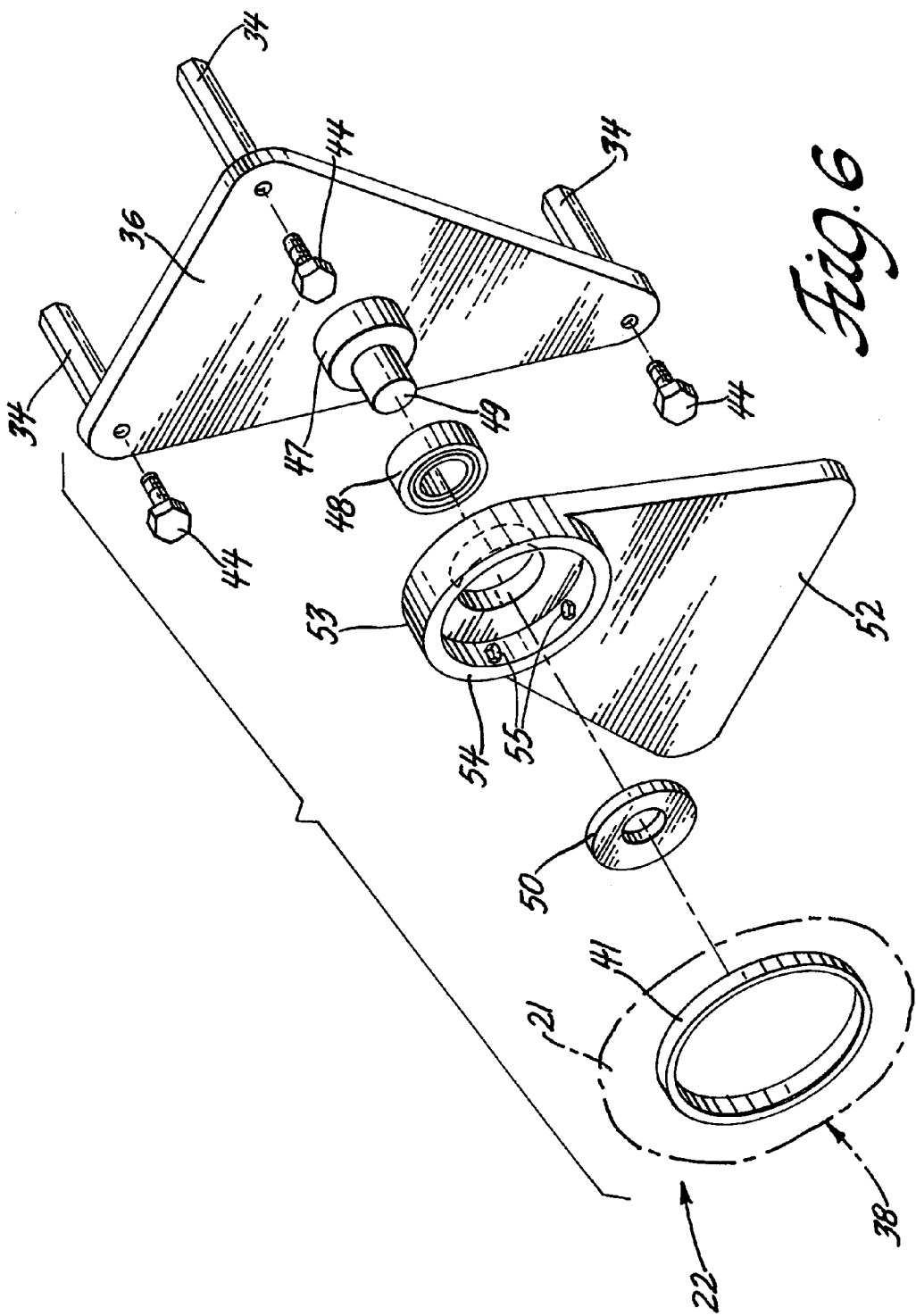

VISUAL AND THERMAL SHIELD SYSTEM

GOVERNMENT INTEREST

The invention described herein may be made, used, and licensed by, or for, the United States Government for governmental purposes without paying us any royalty.

BACKGROUND AND SUMMARY

A significant characteristic of modern military vehicles is their appearance when viewed through an optical instrument. These vehicles have unique visual indicators and/or notational thermal signatures that can be used to readily identify their utility and warfighting capabilities. Reconnaissance on a battlefield with optical instruments is thus vital to both friendly and hostile forces for accurate differentiation between friendly forces, potential targets, and normal background scenes. Following differentiation, the respective forces are then likely to execute offensive actions or perform defensive measures to protect themselves and their equipment. Therefore, the visual appearance and thermal signature of military vehicles are tactical disadvantages which must be avoided.

With regard to thermal signature in low illumination, the axles, hubs, wheels, and tires of these vehicles provide the greatest concern for potential identification. Herein, these components are also commonly referred to as a wheel assembly or components. When a military vehicle traverses a terrain during night or low visibility events, these components are heated by friction and "glow" more than either the vehicle exterior or the adjacent background scenery. Thusly, when a vehicle is viewed through any infrared device, said components provide a ready means for detection, targeting, and destruction by hostile forces. As used herein, a representative military vehicle is a wheeled armored vehicle generally known to international military forces as a Light Armored Vehicle (LAV) which is produced by GM Defense, London, Ontario, Canada. Other examples in the military fleet include wheeled tactical and combat trucks, selected from the STRYKER®; heavy transport trucks; heavy expanded-mobility tactical trucks; and high-mobility, multi-purpose, wheeled vehicles.

A commonly assigned patent, U.S. Pat. No. 6,254,194, claims a device for reducing the thermal signature of the wheel assembly of a military vehicle by provision of a generally planar structure of sheet metal stock that is directly bolted to the wheel. This is accomplished by a plurality of multifunctional bolting elements that position said device outboard of the wheel and that also create an insulating air gap between the wheel assembly and said device. As the wheel rotates on the axle, this device dynamically rotates with the wheel since it is fixed thereto. Said device completely eclipses the hub and wheel while only partially covering about 50% of the total tire profile. A preferred embodiment therein comprises an eccentric, lobed, sheet-metal member that increases this coverage area to about 80%, as respectively shown in FIGS. 1 and 2. A variation of the latter embodiment positions an insulating disc between two metal discs to further obscure the area of the wheel by flexible bristles extending from said disc.

It is an object of this invention to introduce a visual and thermal shield system which hinders the interpretation by a viewer of a military purpose and warfighting capability of a vehicle when observed through a modern optical instrument. It is another object herein to provide a resilient shield system that appears substantially the same in a distorted position as it would in a normal, relaxed position. It is a separate object to provide a shield system that is quickly installed, readily removed, and easily adapted for deployment of existing fleets of military vehicles generally employed by international military forces. It is a final object to produce this shield in current manufacturing facilities from available, commercial materials.

BRIEF DESCRIPTION OF THE DRAWINGS

FIG. 6 is an exploded view showing the assembly of major structural components of the shield system of this invention.

DETAILED DESCRIPTION

In sharp contrast to U.S. Pat. No. 6,254,194, we have developed a visual and thermal shield system that effectively obscures thermal signatures and visual indicators from the wheel assemblies of a military vehicle to effectively address longstanding concerns for vehicle and crew survivability. This device is spaced outboard from the wheel and tire to maintain an insulating body of air between said device and the adjacent axle, hub, wheel, and tire. If a plurality of wheels exists on said vehicle, as in FIGS. 1 and 2, then multiple shield systems of this invention will be employed. Expeditiously, our shield system also affords substantial eclipse of the complete tire profile.

Figure 1:
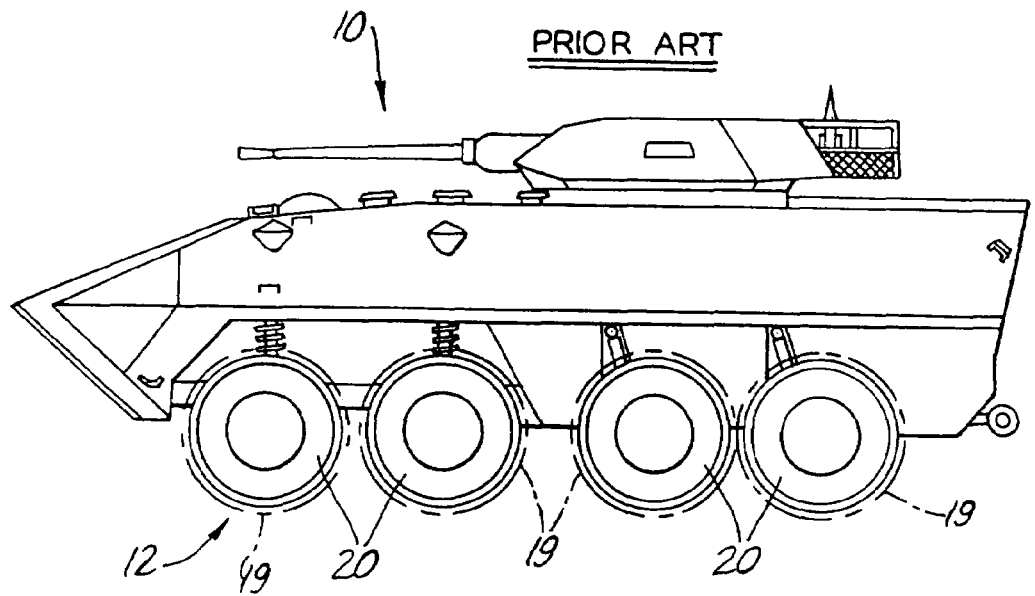
FIG. 1 represents the prior art in plan view as a typical, wheeled military vehicle depicting an identifiable thermal signature caused by substantial heat losses in the area of the axles, hubs, wheels, and tires as viewed through a conventional infrared device during night or low visibility events.

FIG. 1 is a plan view of a typical military vehicle 10 when viewed from an outboard position that is essentially perpendicular to the vehicle. When at rest, a thermal signature is not readily present or detectable by the use of an infrared device. When said vehicle has recently traversed an off-or on-road tract, however, the conventional wheel assembly 12, including axle 14, hub 16, wheel 18, and tire 20 (as depicted in FIG. 3), are exposed to extensive friction. Such friction resides in assembly 12 for periods of time and causes the emission of a characteristic "glow" 19 therefrom as indicated in the tire areas. This "glow" yields a thermal signature which may be employed by an enemy or a friendly to identify the vehicle and its warfighting capability. As a countermeasure, FIG. 2 depicts the cloaking effect of this invention to solve this problem.

Figure 2:
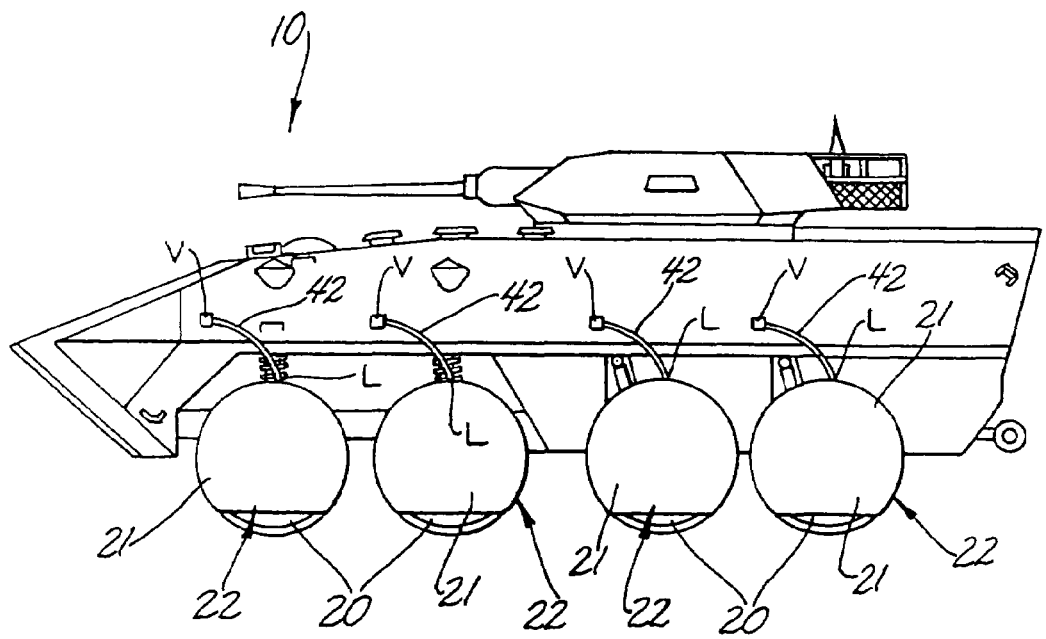
FIG. 2 is a plan view of the vehicle of FIG. 1 which has been equipped with the substantially eclipsing shield of the present invention.
Figure 3:
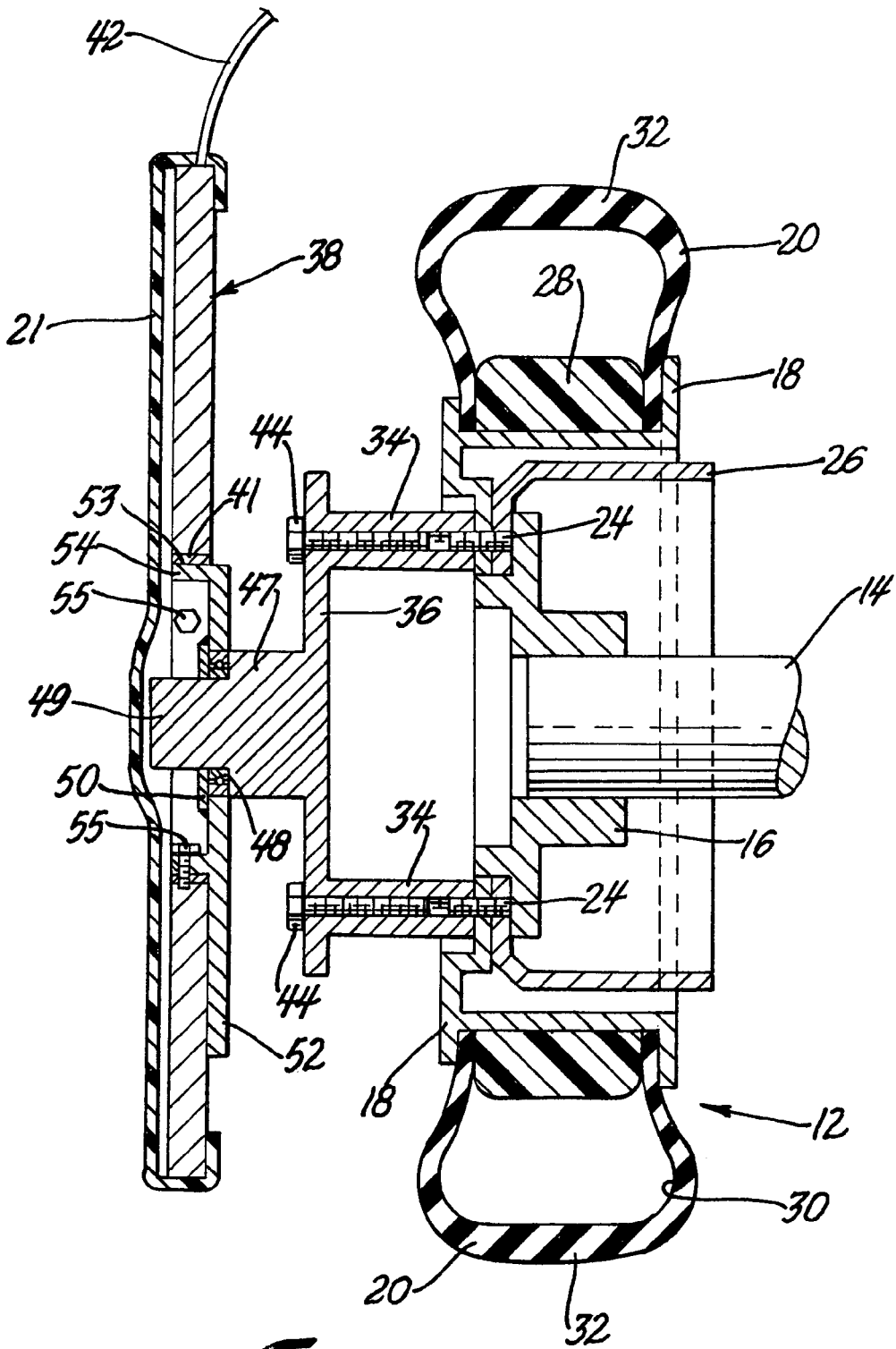
FIG. 3 is a rear sectional view of FIG. 2 depicting a single wheel assembly, comprising an axle, hub, wheel, and tire, which has our visual and thermal shield system mounted thereon.

FIGS. 2 and 3 herein further depict our shield system 22 in combination with a conventional wheel assembly 12 of a military vehicle 10. The outer shell 21 of this shield masks the entire assembly 12 and reduces any thermal signature. Said assembly 12 includes hub 16 fitted on the end of an axle 14 of the vehicle, with said hub having a set of eight threaded lugs or studs 24 that are concentrically affixed and equally spaced thereabout in an octagonal bolting pattern. These studs receive and mount the wheel 18 and brake drum 26 by way of eight suitable apertures through which said studs can protrude. For most military vehicles, the tire 20 is a run-flat tire having a solid annular insert 28, an inflatable carcass 30, and an off-road, all terrain tread 32. It is noted that the above number of studs and apertures, as well as the bolting patterns, may vary from vehicle to vehicle.

Similar to conventional mountings, the wheel 18 and drum 26 are held fast to hub 16 by five, stud-compatible nuts (not shown) with internal threads that match the standard lugs. The remaining three studs of the wheel are fitted with three hexagonal fasteners 34 that are elongated as compared to the above mentioned nuts. The inboard end of these fasteners has a threaded bore of matching threads for receiving the three remaining threaded studs 24 and securely bearing against the wheel 18. The outboard end of these fasteners also has a threaded bore for accepting a wheel mounting bracket 36 of this invention. This bracket is an isosceles triangle in form that has apertures in each angle. It is mounted to the wheel in an inverse position with its base fastened at the wheel top by two bolts 44 within the bolting pattern along a parallel line and its apex fastened by a single bolt 44 at a point nearest the ground as shown in FIG. 3. The shaft end of bolts 44 pierce the above mentioned bores at the outboard ends of fasteners 34 and they are readily torqued into appropriate assembly position. These elongate hexagonal fasteners 34 also function herein as spacers to keep shield device 22 axially remote from wheel 18 and tire 20 by a predetermined distance of engineering choice. Thereby, an insulating body of air occupies the gap between shield 22 and wheel assembly 12.

Figure 4:
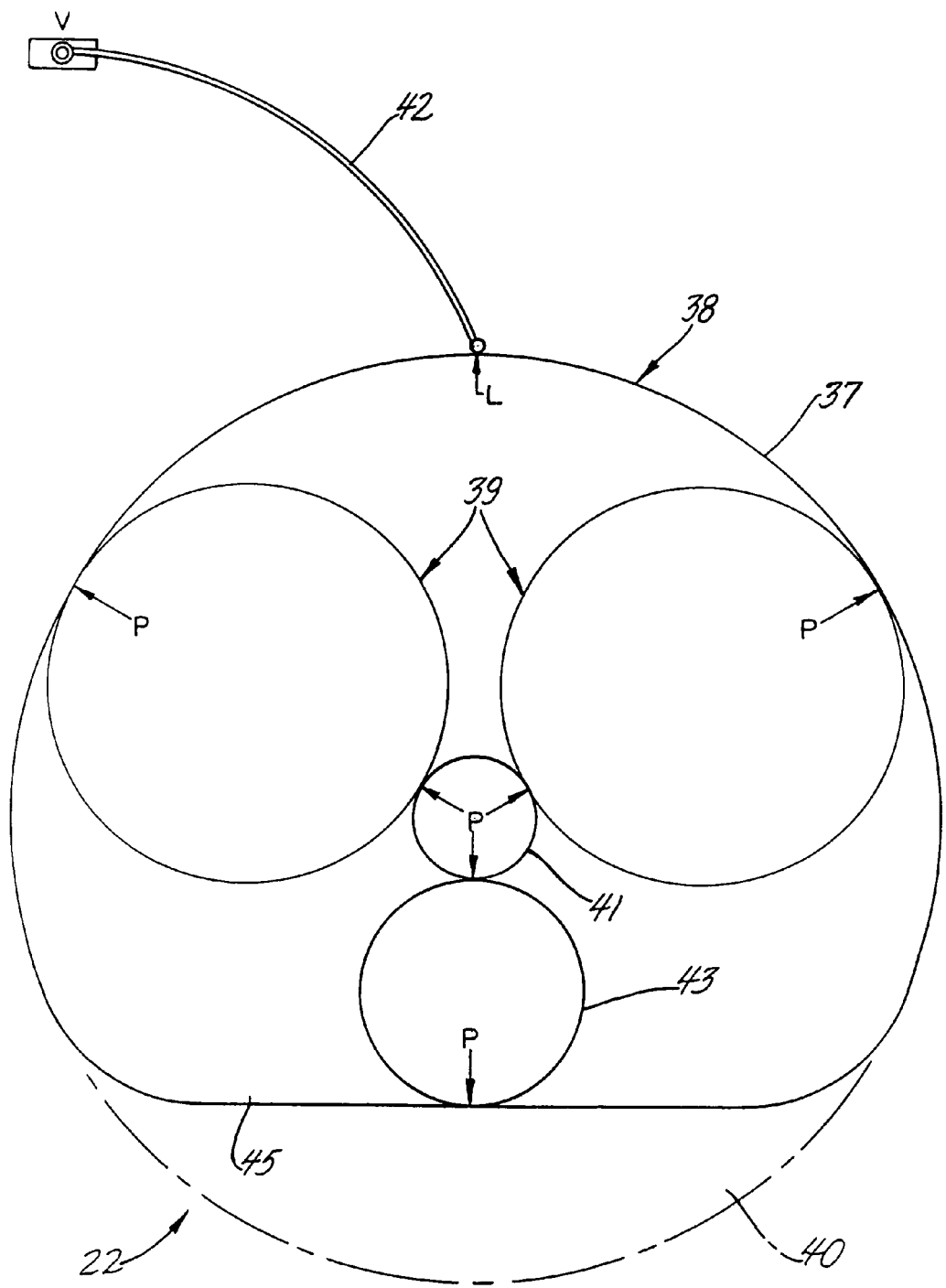
FIG. 4 is a plan view of the skeletal framework of our visual and thermal shield system.

Referring now to FIGS. 2 and 4, a frontal view of the skeletal framework 38 of our visual and thermal shield system 22 is depicted with the outer shell or cover 21 removed to show its basic form. It is comprised of an outer, substantially circular or annular structure 37 with a small segment 40 of that circle removed at the bottom along chord 45 to prevent dragging or ground contact. It is noted that the ground clearance so provided is necessary for travel in off-road conditions, such as snow, sand, mud, and like soft or even rough terrains that contain obstacles, barricades, and debris. Further, this clearance is essential to accommodate tire distortions or suspension travel as the vehicle jostles about.

The internal structure of skeletal framework 38 is formed by four circular (annular) elements which spatially fit therein as a reinforcing "Y"-shaped structure that imparts appropriate strength and resiliency to the entire skeletal framework 38. Thus, two identical circles 39 are positioned within the upper reaches of the structure 37 to form branches of the "Y" which are in turn supported by two smaller circles 41, 43 of differing diameters that form the vertical stem of said "Y". These four interior circles are peripherally attached to each other, the bottom of said substantially circular form 37 at the midpoint of its chord 45, and to each other at the indicated points P by any convenient method of engineering choice, such as threaded fasteners, pop-rivets, adhesive bonds, spot welds, and the like. Also attached to the skeletal framework 38, but only on its exterior at point L, is a suitable breakaway lanyard 42 that attaches to vehicle 10 at point V. The purpose of this lanyard is to maintain our shield system in proper orientation and alignment at all times during any activities.

Since it is entirely possible that the structural framework 38 will come into direct contact with the ground, or objects thereon as it travels on a typical battlefield, it is desired herein to utilize a highly flexible and resilient structure within our shield. This will impart a greater resistance to damage and will extend the performance of its intended function. This design also permits our claimed visual and thermal shield system 22 to appear substantially the same in a distorted position as it would appear in a normal, relaxed position. For the uses contemplated herein, any thermal signature emitted by the exposed portion of the tire (at segment 40) will likely be minimal and very difficult to interpret since said exposed portion will obviously be hidden within soft soils, vegetation, debris, and like features of battlefield terrains.

Our shield system 22 is conveniently constructed of any suitable material of engineering choice. However, we prefer the use of resilient spring steel and pliable, woven fabrics as the principal construction components. Preferably, the chosen fabrics for the cover 21 are of a tight fitting, interwoven elastomeric fabric that will assume and retain the basic shield form. Each shield system 22 is essentially positioned and held upright to the military vehicle 10 by the combined effect of the breakaway lanyard 42 and the special shield mounting bracket 36 that is attached to the wheel(s) 18 as shown in our FIG. 3. Since components of greatest concern on the vehicle are thereby completely masked or eclipsed by our shield system, an observer remote from the vehicle of FIG. 2 at an outboard position will be unable to readily identify a military purpose or mission for said vehicle.

Referring to FIGS. 3 and 6, and continuing with our installation process, the mounting bracket 36 has a concentric collar 47 that axially extends outward from the approximate center of the planar surface of the aforementioned isosceles triangle. At the outboard end, said collar has an even smaller diameter neck 49 which is machined, stamped, or otherwise formed in said collar. Thusly, neck 49 is also concentric with the larger collar 47 and is efficiently designed to accept and receive thereon a concentric bearing assembly 48 and a pendulum or shield carrier 52. Thereby, a structural housing for the bearing assembly 48 is formed between the concentric collar 47 on the inboard side, the bearing retainer 50 on the outboard side, the smaller diameter neck 49 on the bottom, and a conformal bore or opening within the shield carrier 52 along the radial exterior of said bearing assembly. The combination of elements 47, 49, 50, and 52 provides an internal bearing race for the bearing assembly 48. Generally, the bearing assembly may be selected from the group consisting of ball, roller, or equivalent types of bearings. This assembly is conveniently secured in place by any suitable retention means, such as a threaded bore in the bearing retainer 50 that conforms to similar threads on neck 49, bolts, welds, or standard retaining clips and/or cotter pins which pass through indentations or apertures in the neck 49, flange 54, or mounting bracket 36.

Figure 5:
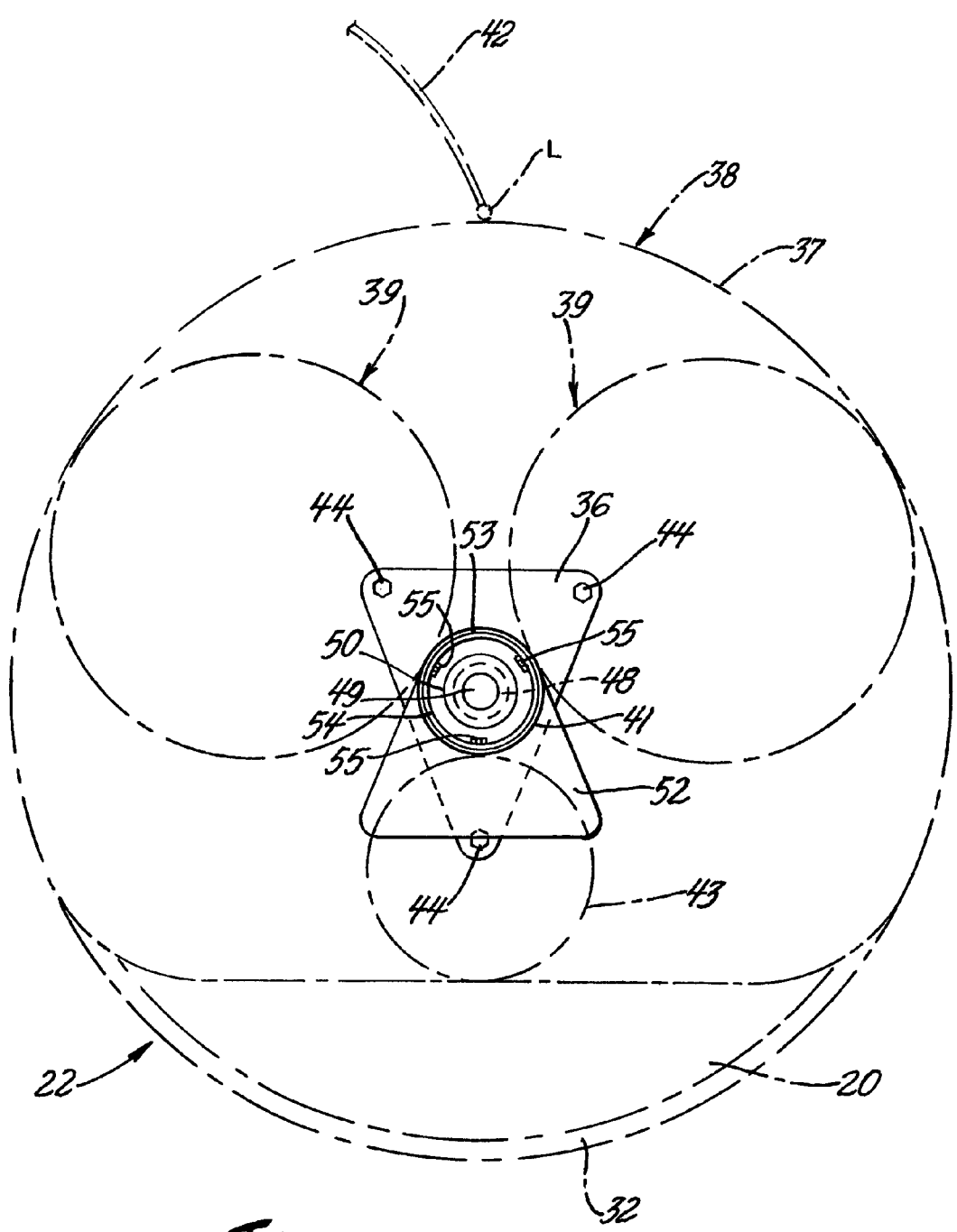
FIG. 5 is a plan view from the outboard direction of FIG. 3 of a mounted shield of this invention with the outer shell removed.

Referring to FIG. 5, the shield carrier 52 is essentially an isosceles triangle having a rounded apex 53. Said carrier is mounted upright to the wheel 18 and the military vehicle 10 when viewed from an outboard position. Positioned within this rounded apex is a conforming aperture 51 of sufficient diameter to axially receive and radially retain the bearing assembly 48. The carrier 52 is in turn held in position on the mounting bracket 36 by the bearing retainer 50. By design, said retainer has a somewhat larger diameter than said conforming aperture of the carrier to hold the carrier in position. As explicitly shown in FIGS. 3 and 6, the shield carrier 52 also has a circular flange 54 that axially extends outboard from the planar surface of said carrier and beyond the bearing retainer 50. Essentially, this circular flange 54, the retainer 50, and the smaller diameter neck 49 are all concentric about one another.

FIG. 5 provides a plan view of a mounted, visible or thermal shield system 22 of this invention as depicted when viewed outboard of FIG. 3. The outer shell or cover 21 has been removed from the shield 22 to allow inspection of the total assembly. As revealed herein, the assembly of the shield system 22 to the wheel 18 is completed by insertion of the structural framework 38, and specifically annular ring 41, about the circular flange 54 of the shield carrier 52, circular flange 54 providing accepting means for receiving annular ring 41. Thereafter, carrier bolts 55 are positioned within conforming apertures at points P within smaller diameter circle 41 and then threaded into circular flange 54. While the bolt heads of bolts 55 are depicted in FIGS. 5 and 6 as being internal, it is to be understood that these bolts could also be external to the flange 54. Thereby, the four internal circles 39, 39, 41, and 43 are securely adjoined to said circular flange. It is also understood that the mounting bracket 36 is partially obscured in FIGS. 5 and 6 by mounting of the skeletal framework 38 to the shield carrier 52.

An alternate embodiment of the mounting bracket 36 of our invention would entail an integral structure incorporating bracket 36 and the three hexagonal fasteners 34 into a unitary structure. Then, the three studs 24 which formerly passed through the wheel 18 to receive the inboard side of the hexagonal fasteners 34 will be removed. Thereafter, the three bolts 44 will be replaced with longer, threaded shafts sufficient to extend from the outboard side of bracket 36 through said unitary structure to secure the wheel 18 and the drum 26 to hub 16.

We wish it understood that we do not intend to be limited to the exact details of construction or the method shown herein since obvious modifications will occur to those skilled in the relevant art without departing from the spirit and scope of the following claims.

What is claimed is:

1. A shield system for hindering identification of a vehicle wherein said vehicle has a wheel assembly including an axle, hub, wheel, and tire, said shield system comprising:
 a. holding means on said hub for extension through said wheel and receipt thereon of a plurality of attaching means, said holding means comprising a plurality of threaded studs extending axially outwardly from the hub, said plurality of studs being equally spaced apart about the hub within a circular pattern, said attaching means which are received on said plurality of threaded studs being selected from the group consisting of compatible, internally threaded nuts and a spacing means, said spacing means comprising a plurality of elongate hexagonal fasteners and a mounting bracket, said elongate hexagonal fasteners having internal threaded bores at each end which are compatible with said threaded studs, said mounting bracket comprising a metal bracket having a geometry of an inverted isosceles triangle as mounted against said wheel with blind apertures centered within each angle for receiving threaded bolts which pierce said apertures and the outboard ends of said hexagonal fasteners;
 b. mounting means for mounting a shield carrier means to the wheel assembly through a plurality of fastening means;
 c. bearing means positioned on said mounting means and retained thereon by an outboard retainer means positioned against said shield carrier means having an interior annular bore for radially housing said bearing means;
 d. accepting means on said shield carrier means for receiving thereon an annular ring of a skeletal framework means of said shield system;
 e. connecting means for connection of said skeletal framework means with said annular ring to said shield carrier means;
 f. covering means of a substantially continuous annulus of durable, woven fabric deployed about the structural framework means; and
 g. orienting means to hold said skeletal framework in alignment and proper orientation to said vehicle.

2. The shield system of claim 1 wherein said threaded bolts are positioned within said apertures in the metal bracket at substantially the 45, 180, and 225 degree positions about the wheel.

3. The shield system of claim 2 further including a concentric, cylindrical collar that axially extends outwardly from a planar surface at an approximate center of said metal bracket with a smaller diameter, cylindrical neck that further concentrically extends outboard of said collar.

4. The shield system of claim 3 wherein said neck further comprises external threads and said outboard retainer means further comprises an internally threaded bore within an annular disc retainer, adapted to engage the external threads of said neck.

5. A shield system for hindering identification of a vehicle wherein said vehicle has a wheel assembly including an axle, hub, wheel, and tire, said shield system comprising:
 a. holding means on said hub for extension through said wheel and receipt thereon of a plurality of attaching means;
 b. shield carrier means comprising a metal carrier bracket essentially having a geometry of an upright isosceles triangle with a rounded apex, said apex including an interior, annular bore, said bore adapted to receive a bearing means, as said carrier bracket is retained against said metal mounting bracket by an outboard retainer means;
 c. mounting means for mounting said shield carrier means to the wheel assembly through a plurality of fastening means;
 d. bearing means positioned on said mounting means and retained thereon by an outboard retainer means positioned against a shield carrier means having an interior annular bore for radially housing said bearing means;
 e. accepting means on said shield carrier means for receiving thereon an annular ring of a skeletal framework means of said shield;
 f. connecting means for connection of the skeletal framework means with said annular ring to the shield carrier means;
 g. covering means of a substantially continuous annulus of durable, woven fabric deployed about the structural framework means of said shield; and
 h. orienting means to hold said skeletal framework in alignment and proper orientation to said vehicle.

6. The shield system of claim 5 further including, about the rounded apex of said metal carrier bracket a circular flange concentric with said annular bore and axially extending therefrom in an outboard direction for a predetermined distance.

7. A shield system for hindering identification of a vehicle wherein said vehicle has a wheel assembly including an axle, hub, wheel, and tire, said shield system comprising:

a. holding means on said hub for extension through said wheel and receipt thereon of a plurality of attaching means;
b. mounting means for mounting a shield carrier means to the wheel assembly through a plurality of fastening means;
c. bearing means positioned on said mounting means and retained thereon by an outboard retainer means positioned against said shield carrier means, said shield carrier means having an interior annular bore for radially housing said bearing means;
d. accepting means on said shield carrier means for receiving thereon an annular ring of a skeletal framework means of said shield, said skeletal framework comprising an outer, substantially circular structure having a small portion removed along a chord at the bottom of said structure to prevent ground contact, and an internal "Y"-shaped structure comprised of four annular rings that spatially fit within said outer structure to reinforce and impart resiliency to said skeletal framework means;
e. connecting means for connection of the skeletal framework means with said annular ring to the shield carrier means;
f. covering means of a substantially continuous annulus of durable, woven fabric deployed about the structural framework means of said shield; and
g. orienting means to hold said skeletal framework in alignment and proper orientation to said vehicle.

8. The shield system of claim 7 wherein the "Y"-shaped internal structure has two identical annular rings positioned within the upper reaches of said outer structure to form branches of the "Y"-shaped structure which in turn are supported by two annular rings of differing, smaller diameters that form the vertical stem of said "Y"-shaped structure.

9. The shield system of claim 7 wherein said outer and internal structures of said skeletal framework means are peripherally attached to one another by fixing means selected from a group consisting of threaded fasteners, a weld, pop-rivets, and an adhesive bond.

10. The shield system of claim 9 wherein said threaded fasteners are threaded bolts.

* * * * *